«12» United States Patent
Manion et al.

«10» Patent No.: US 8,776,188 B2
«45» Date of Patent: Jul. 8, 2014

«54» REMOTE DESKTOP ACCESS

«75» Inventors: Todd R. Manion, Redmond, WA (US);
Ryan Y. Kim, Sammamish, WA (US);
Kestutis Patiejunas, Sammamish, WA (US)

«73» Assignee: Microsoft Corporation, Redmond, WA (US)

«*» Notice: Subject to any disclaimer, the term of this patent is extended or adjusted under 35 U.S.C. 154(b) by 1629 days.

«21» Appl. No.: 12/047,334

«22» Filed: Mar. 13, 2008

«65» Prior Publication Data

US 2009/0235342 A1 Sep. 17, 2009

«51» Int. Cl.
*G06F 15/16* (2006.01)

«52» U.S. Cl.
USPC ............................................................. 726/5

«58» Field of Classification Search
USPC ............................................................. 726/5
See application file for complete search history.

«56» References Cited

U.S. PATENT DOCUMENTS

| | | | | |
|---|---|---|---|---|
| 6,950,991 | B2 * | 9/2005 | Bloomfield et al. | 715/738 |
| 7,240,091 | B1 * | 7/2007 | Hopmann et al. | 709/203 |
| 2004/0169657 | A1 * | 9/2004 | Morgan et al. | 345/501 |
| 2005/0114711 | A1 * | 5/2005 | Hesselink et al. | 713/201 |
| 2007/0002367 | A1 * | 1/2007 | Yuan | 358/1.15 |
| 2009/0112882 | A1 * | 4/2009 | Maresh et al. | 707/10 |
| 2009/0113520 | A1 * | 4/2009 | Karstens | 726/3 |
| 2009/0164994 | A1 * | 6/2009 | Vasilevsky et al. | 718/1 |
| 2009/0182955 | A1 * | 7/2009 | Cherukuri | 711/141 |
| 2009/0276771 | A1 * | 11/2009 | Nickolov et al. | 717/177 |
| 2010/0198944 | A1 * | 8/2010 | Ho et al. | 709/217 |

* cited by examiner

*Primary Examiner* — Krista Zele
*Assistant Examiner* — Esther Benoit
«74» *Attorney, Agent, or Firm* — Bryan Webster; Andrew Sanders; Micky Minhas

«57» ABSTRACT

A method of accessing a first computing device from a second computing device using a remote desktop service is disclosed. The first and second device register are authenticated and registered with a remote access gateway. In some embodiments, the remote access gateway stores a copy of the first computer and changes made to the copy are synchronized with the actual first computer when it access the remote access gateway. A virtual operating system experience on the second computer is virtually the same as the real operating system experience on the first computer.

17 Claims, 8 Drawing Sheets

REMOTE DESKTOP ACCESS

BACKGROUND

This Background is intended to provide the basic context of this patent application and it is not intended to describe a specific problem to be solved.

Computers have changed the world. Users have come to rely on computers for everything from writing checks to writing patent applications. However, it did not take long for users to realize that it would be useful to have a single computer that the user could have at all times. Laptops are useful tools and are transportable, but there are times when a user would like to access a first computer from a second computer, such as when a file is left on a particular computer and the first computer is remote geographically.

Logically, solutions to access one computer from another computer have been proposed. These solutions have difficulties, such as requiring compromises in how the remote computer is viewed on the local computer, what functions may be executed, how much additional software and hardware is needed and how much security is necessary.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of accessing a first computing device from a second computing device using a remote desktop service is disclosed. A connection is initiated on the second computing device to connect to the first computing device and a rich remote desktop client is started on the second computer. A request is created for a remote desktop protocol session with the first computing device using a mesh operating environment where the mesh operating environment obtains its settings from a mesh operating environment configuration file. The request is communicated through a cloud service to the first computing device. An authorization is received to begin the desktop protocol session from a remote desktop server application on the first computing device through the cloud service and a channel is established from the second computing device to the first computing device through the cloud service. Remote desktop protocol data flow begins from the first computer to the second computer through the cloud services where a second computer display and operating system experience is virtually the same as a first computer and all operations on the first computer are available on the second computer by using the second computer display.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
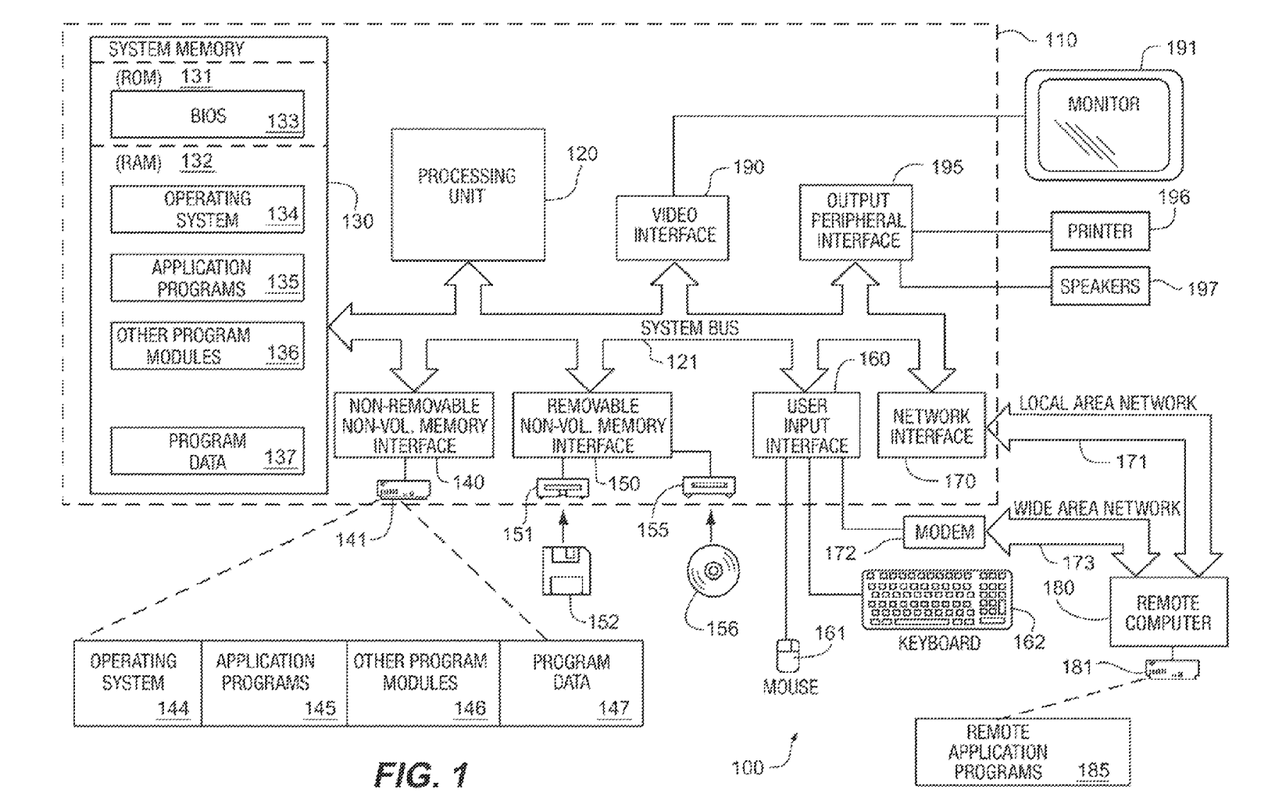
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method, the user interface and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. Computer 110 typically includes a variety of computer readable media. Computer readable media can be any available media that can be accessed by computer 110 and includes both volatile and nonvolatile media, removable and non-removable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers or computing devices may be used.

Figure 2:
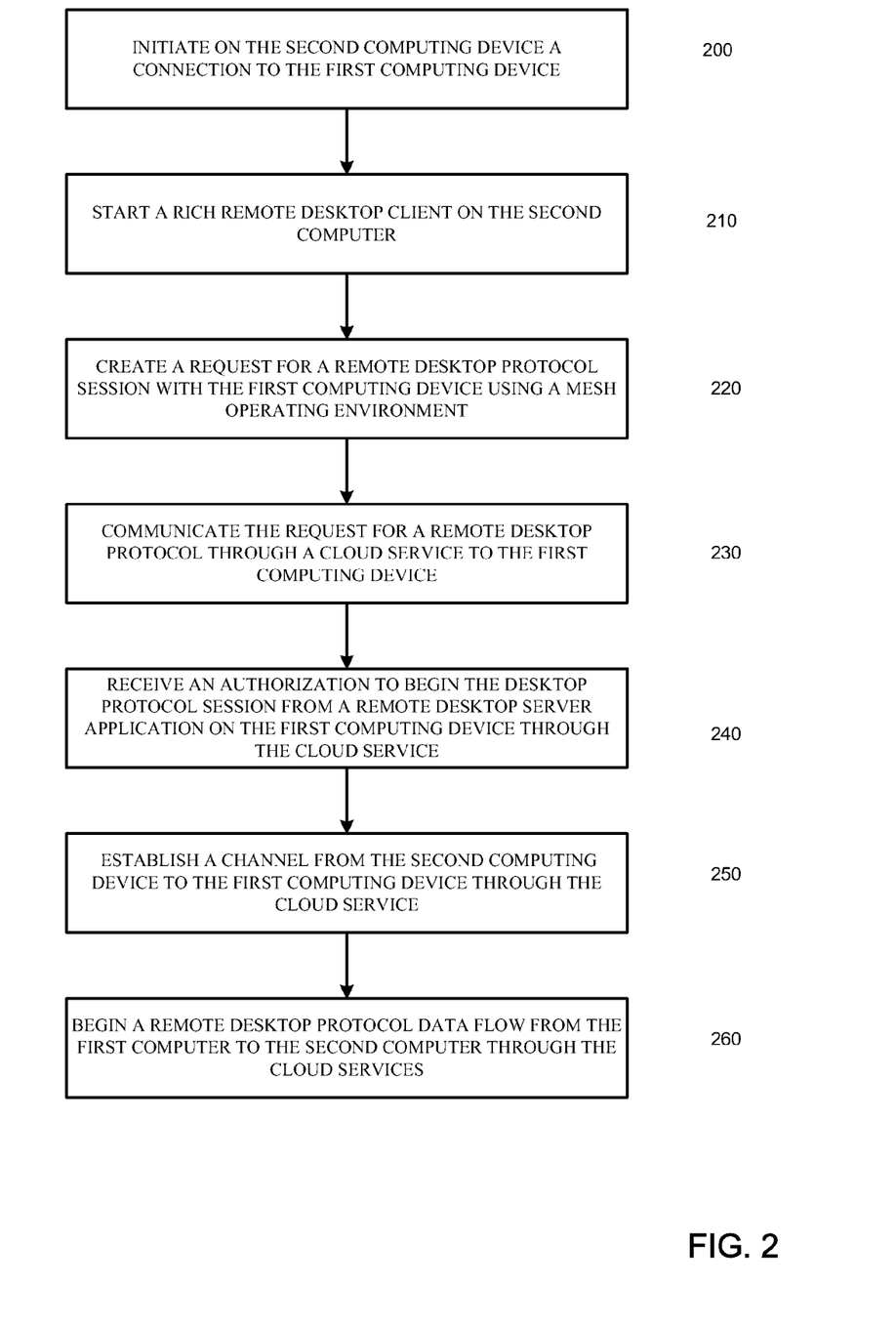
FIG. 2 is a flowchart of a method of accessing a first computing device from a second computing device using a remote desktop service.

FIG. 2 illustrates a method of accessing a first computing device 700 (FIG. 7) from a second computing device 710 (FIG. 7) using a remote desktop service. At block 200, on the second computing device 710 a connection to the first computing device 700 may be initiated. The initiation may be started by a user or may be started by an application or a combination of the two. At block 210, a rich remote desktop client may be started on the second computing device 710. The client may eventually display virtually an identical display of the display of the first computing device 700. By virtually identical, the data displayed should be the same, but color may look different from monitor to monitor. In addition, different screen sizes and resolutions may result in the displays appearing different but containing the same displayed data. Anything that can be viewed, accessed or executed on the first computing device 700 will be available to be started on the second computing device 710.

At block 220, a request for a remote desktop protocol session with the first computing device 700 may be created using a mesh operating environment. The mesh operating environment may obtain its settings from a mesh operating environment configuration file. The mesh operating environment may be spread over a network and parts, including duplicate parts, may be spread all over the network and may be accessed from the various network nodes as needed. In addition, other nodes in the mesh may access different parts of the operating environment from any of the nodes on the network.

At block 230, the request for a remote desktop protocol from block 220 may be communicated through a cloud service to the first computing device 700. The cloud service may represent a service or application that controls data through a widely dispersed network, such as the internet. The response to the request may be handled in an endless number of ways. In one embodiment, a display is created on the first computing device 700 where a user may select to allow a user to remotely control the first computing device 700. In another embodiment, the first computing device 700 has a list of acceptable second computing device 710s that have standing permission to remotely access the first computing device 700. As an example, a single user may configure the first computing device 700 to accept connections from a second computing device 710 where the first computing device 700 is user A's home computing device and the second computing device 710 is user A's work computing device. Of course, other embodiments are possible. In yet another embodiment, if a response is not received after a threshold period of time, the permission is not granted.

At block 240, an authorization to begin the desktop protocol session from a remote desktop server application may be received on the first computing device 700 through the cloud service. The first computing device 700 may be a node in the network cloud and may receive the request for a remote connection. As described above, the authorization may be automatic, may be set up to be automatic if certain criteria are met or may require a user at the first computing system, to agree to permit access.

At block 250, a channel may be established from the second computing device 710 to the first computing device 700 through the cloud service. Assuming permission was granted in block 240, a channel may be created. The channel may take a variety of forms. In one embodiment, the channel is anonymous to protect privacy and snooping. The channel may be created using secure socket layers (SSL) or through any other appropriate technology or methodology.

At block 260, a remote desktop protocol data flow may begin from the first computing device 700 to the second computing device 710 through the cloud services. As a result, the second computing device 710 display may be virtually the same as a first computing device 700 display. Any operation on the first computing device 700 may be available on the second computing device 710 by using the second computing device 710 display. The display may be a copy of the graphical elements of the first display making the display on the second computing device 710 to be viewed as virtually exact as the first display.

Figure 3:
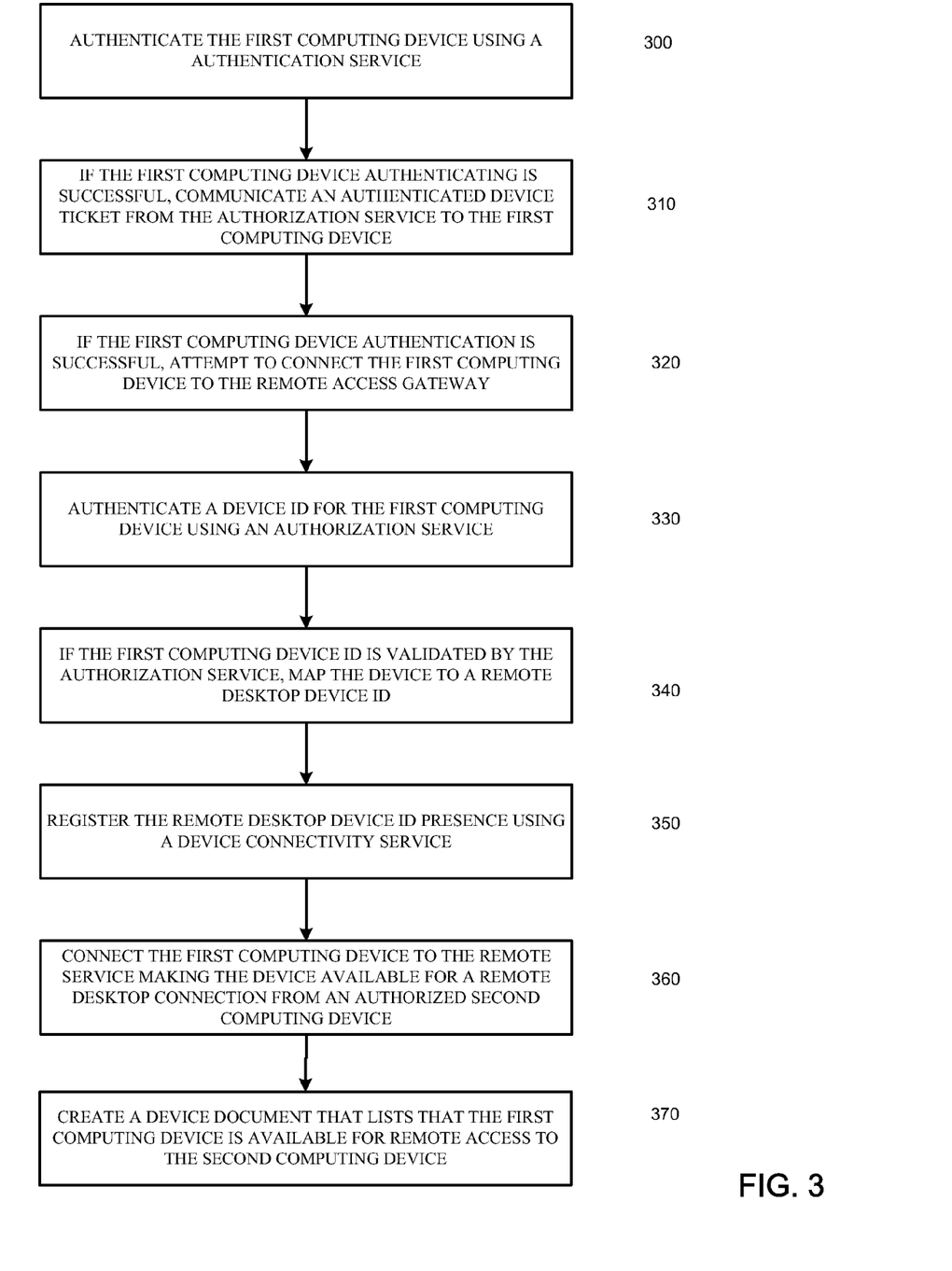
FIG. 3 is a flowchart of registering the first computer with a remote access gateway to be available as a remote desktop.

FIG. 3 may display additional element of the claims. To be available to be remotely accessed, the first computing device 700 may have to register with a remote access gateway. The registration may take a variety of forms and use hardware or software applications. FIG. 3 illustrates one embodiment of registering the first computing device 700 with a remote access gateway. At block 300, the first computing device 700 may be authenticated using an authentication service. The authentication service may be any of a variety of services or applications such as the Passport authentication service from Microsoft Corp®.

At block 310, if the first computing device 700 authenticating is successful, an authenticated device ticket may be communicated from the authorization service to the first computing device 700. The ticket may be an electronic package of data that may be communicated. The ticket may be encrypted or otherwise protected such that creating a fraudulent or duplicate ticket would be virtually impossible.

At block 320, if the first computing device 700 authentication is successful, the first computing device 700 may attempt to connect to the remote access gateway. Communication connections may be started in a variety of ways. In one embodiment, the Internet is used and a communication including the ticket from block 310 may be communicated to a known IP address. Of course, other networks and other manners of establishing communication are contemplated.

At block 330, a device ID for the first computing device 700 may be authenticated using an authorization service. Each computing device using the remote desktop application may have a unique device ID. The device ID may be assigned by the remote desktop application, may be assigned by the remote access gateway or may be a combination of addresses such as IP addresses and MAC addresses specific to the computing device in question. The device ID may be previously added to an authentication service along with some identification such that the device ID may be verified in the future.

At block 340, if the first computing device 700 ID is validated by the authorization service, the device ID may be mapped to a remote desktop device ID. The remote desktop ID may be a name that is easier to understand and recall such as "Dad's computer" or "Home computer." In this way, difficult to recall device IDs are replaced with easier to recall remote desktop IDs. The remote desktop IDs may be unique to each user or computing device attempting to connect. For example, if John tries to access his home computing device, it may have a remote device ID of "Home" whereas if his wife attempts to access John's home computing device, the remote device ID might be "John's home computer."

At block 350, the remote desktop device ID presence may be registered using a device connectivity service. The device connectivity service may assist in tracking devices that are available and matching the devices with devices authorized to connect to them. Many device connectivity services are possible and are contemplated.

At block 360, the first computing device 700 may be connected to the remote service. The first device is now available for a remote desktop connection from an authorized second computing device 710. The communication may be through the remote access gateway or may be through a peer to peer connection between the first and second computing device 710.

At block 370, a device document may be created that lists that the first computing device 700 is available for remote access to the second computing device 710. The device document also may list any other computing devices that are available for the second device to remotely connect. The device document may contain a variety of details, from a simple list of available computing devices to specific details about the available computing devices to computing devices that have been connected in the past.

Figure 4:
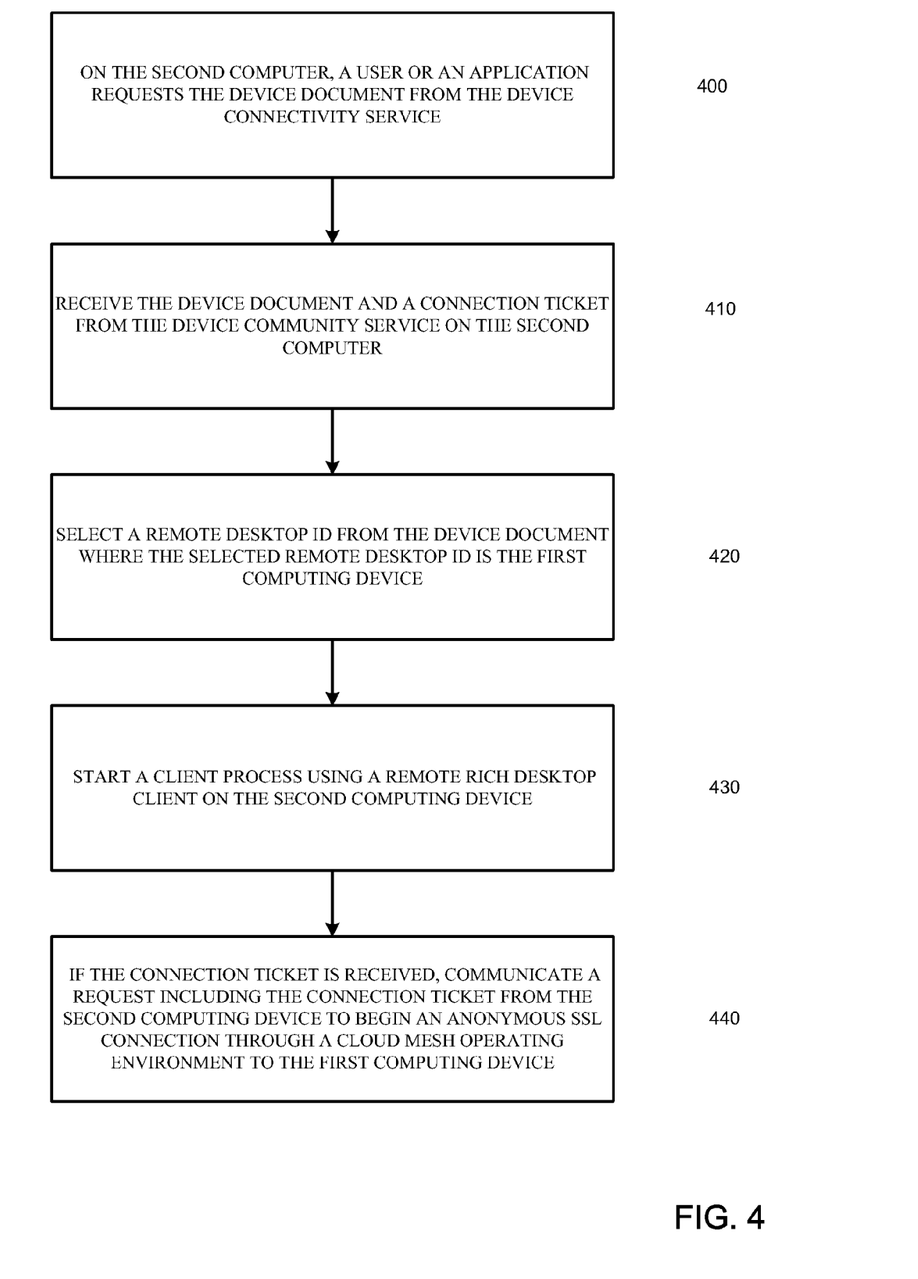
FIG. 4 is a flowchart of a method of how the second computing device may initiate the connection to the first computing device.

FIG. 4 may illustrate how a second computing device 710 may initiate a remote desktop connection to the first computing device 700. At block 400, on the second computing device 710, a user or an application may request the device document from the device connectivity service. The device document comprises a list of remote desktop device ID registered with the device connectivity service. By selecting an available device, a connection ticket may be requested from the remote connectivity service for the selected available device.

At block 410, the second computing device 710 may receive the device document and a connection ticket from the device community service. The ticket may be an electronic package that is difficult to copy or create fraudulently and grants permission to connect. At block 420, a remote desktop ID from the device document may be selected where the selected remote desktop ID is the first computing device 700. Any of the remote desktop IDs may be the first computing device 700 but for easy of explanation, the first computing device 700 is used as an exemplary computing device that is available for remote connection.

At block 430, a client process using a remote rich desktop client is started on the second computing device 710. The desktop client may manage the process of connection to the remote desktop. At block 440, if the connection ticket is received, a request including the connection ticket may be communicated from the second computing device 710 to begin an anonymous SSL connection through a cloud mesh operating environment to the first computing device 700. As mentioned previously, the cloud mesh environment may spread application files across a network where nodes may not have the entire application by may rely on other network nodes to supply needed parts of an application. At this point, the second computing device 710 may be ready to remotely control the first computing device 700.

Figure 5:
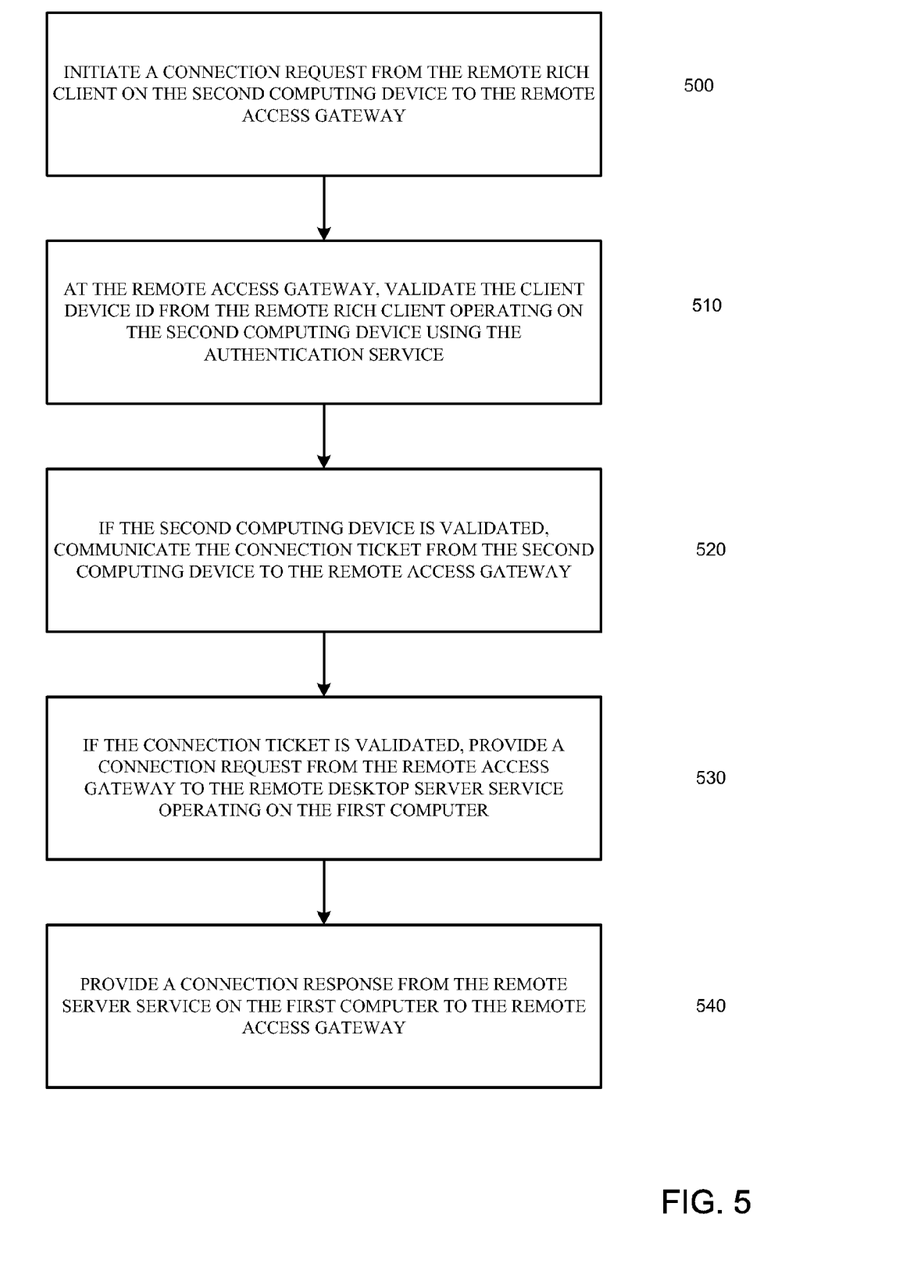
FIG. 5 is a flowchart of more detailed illustration of how the second computer may register with a remote access gateway to connect with the first computing device.

FIG. 5 may illustrate additional detail on how the second computing device 710 may request to connect to the first computing device 700. At block 500, a connection request may be initiated from the remote rich client on the second computing device 710 to the remote access gateway. The connection may be initiated by a user, by another computing device or by an application.

At block 510, at the remote access gateway, the client device ID from the remote rich client operating on the second computing device 710 may be validated using the authentication service. The authentication service may be as described previously, such as the Passport® service offered by Microsoft Corporation®.

At block 520, if the second computing device 710 is validated, the connection ticket may be communicated from the second computing device 710 to the remote access gateway. In addition, at block 530, if the connection ticket is validated, a connection request may be provided from the remote access gateway to the remote desktop server service operating on the first computing device 700. At block 540, a connection response may be provided from the remote server service on the first computing device 700 to the remote access gateway. At this point, the first computing device 700 is ready to be remotely controlled by the second computing device 710.

Figure 6:
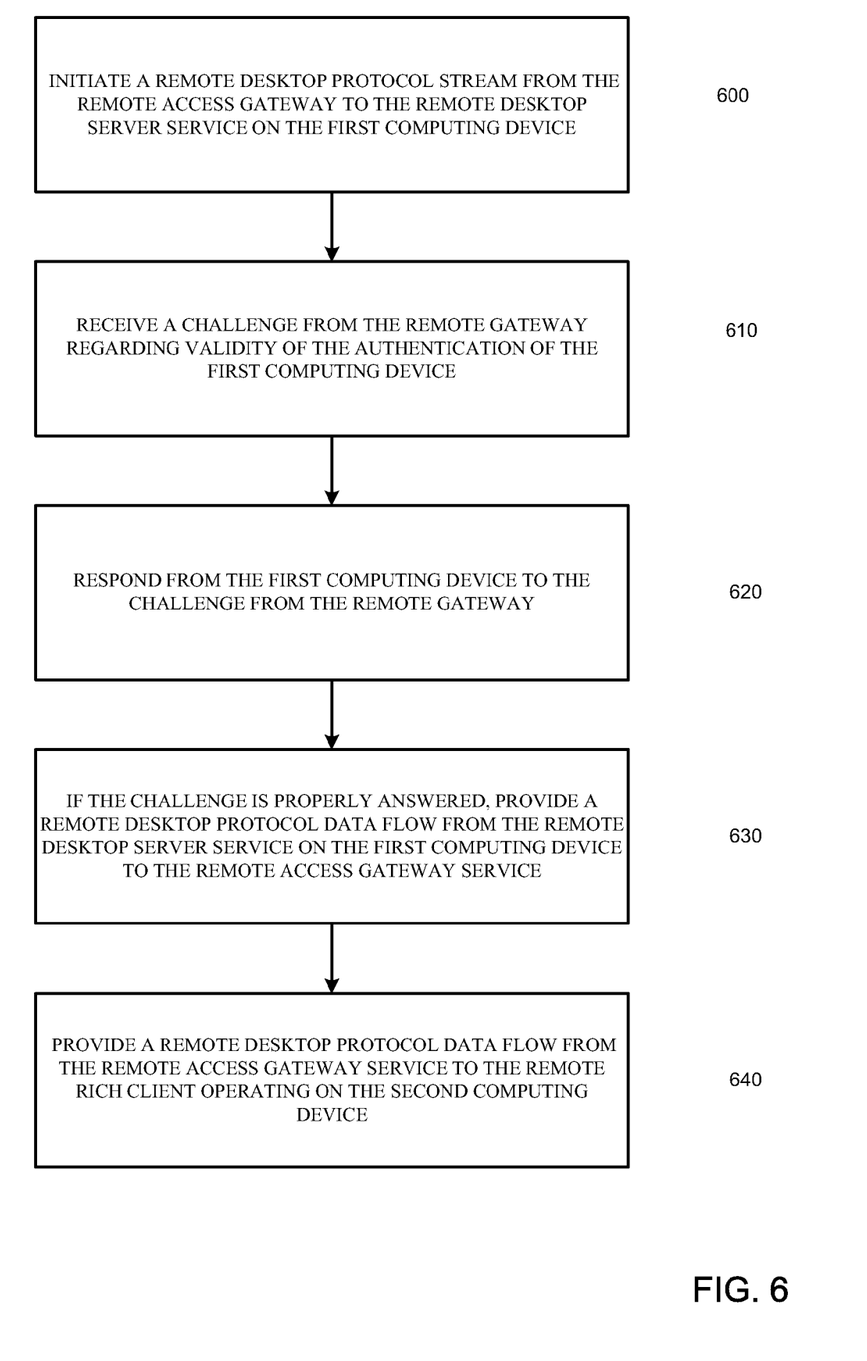
FIG. 6 is a flowchart of a more detailed method of registering the first computing device with the remote access gateway.

FIG. 6 may further illustrate how the connection may be established from the first computing device 700 to the remote access gateway and to the second computing device 710. At block 600, a remote desktop protocol stream may be initiated from the remote access gateway to the remote desktop server service on the first computing device 700. At block 610, a challenge may be received from the remote gateway regarding validity of the authentication of the first computing device 700. The challenge may be a request for a password or may be an encryption type challenge response. Of course, other challenge responses are possible and are contemplated.

At block 620, the first computing device 700 may respond to the challenge from the remote gateway. As previously mentioned, the response may be automatic, may be from an application or may be from a user.

At block 630, if the challenge is properly answered, a remote desktop protocol data flow may be provided from the remote desktop server service on the first computing device 700 to the remote access gateway service. The data flow may be created through a variety of manners such as secure socket layer (SSL) or any other appropriate data flow.

At block 640, a remote desktop protocol data flow from the remote access gateway service may be provided to the remote rich client operating on the second computing device 710. The data is now flowing from the first computing device 700 to the second computing device 710 such that second computing device 710 can view and control the desktop on the first computing device 700 from the second computing device 710.

Figure 7:
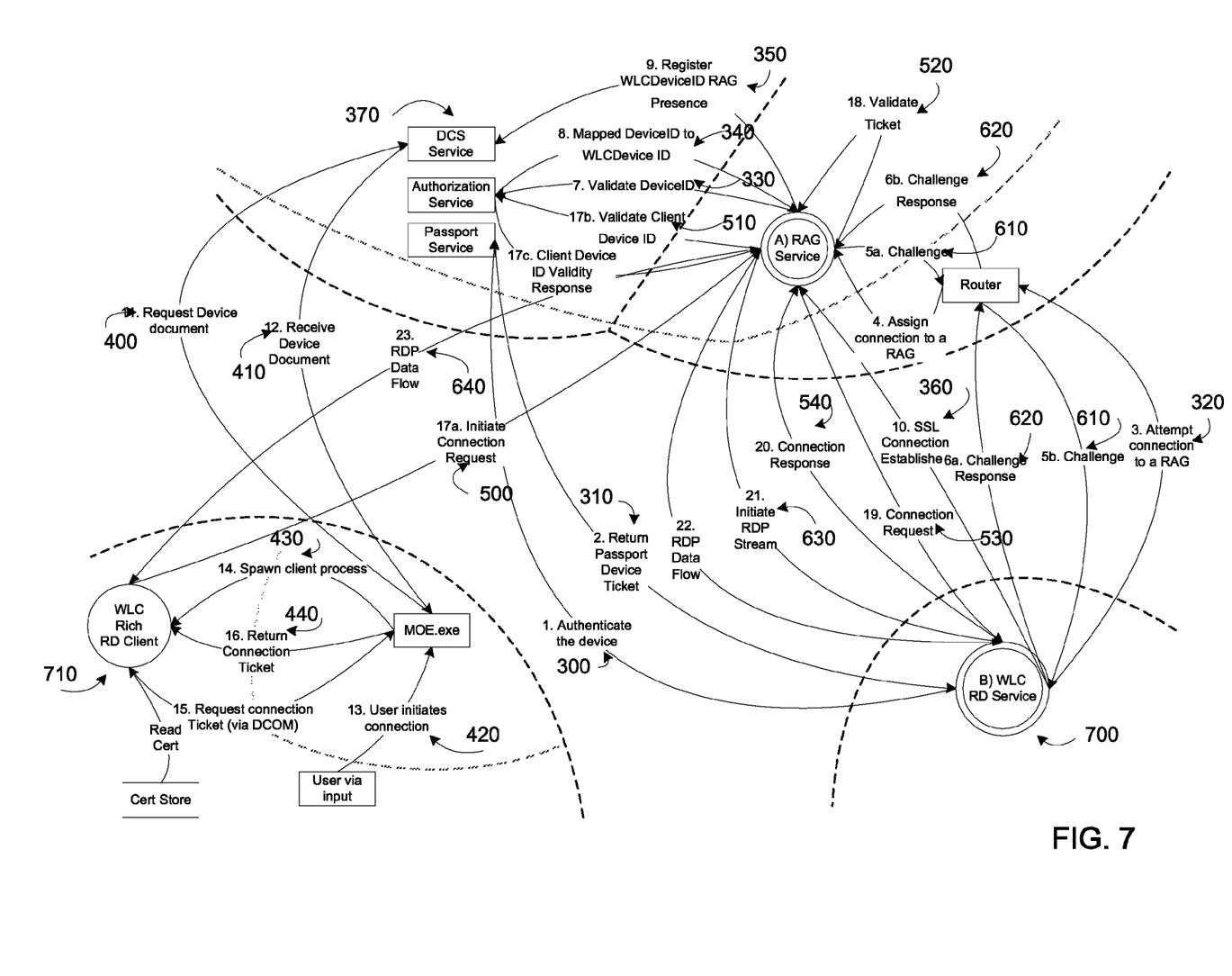
FIG. 7 is an illustration of one embodiment of an entire remote desktop access system.

FIG. 7 may be an illustration of the overall remote desktop system. The elements in FIG. 7 have been described in the previous FIGS. 2-6. In FIG. 7, all the elements are combined into a single diagram. For the sake of brevity, the description of the labeled elements will not be repeated here.

As the data passes through the cloud services, if desired, the cloud may keep a copy of the first computing device 700. In this way, the second computing device 710 may make changes to the first computing device 700 even if the first computing device 700 is not currently connected to the cloud mesh. When the first computing device 700 is connected, the changes made in to the desktop copy in the cloud will be synchronized with the first computing device 700 itself. Similarly, changes made to the first computing device 700 may be synchronized with the copy stored in the cloud mesh and these changes may then be accessible to the second computing device 710. In effect, a copy of the first computing device 700 is kept in the cloud mesh which may be accessed from anywhere at anytime (assuming permission is granted). Instead of accessing the first computing device 700, a copy of the first computing device 700 that is stored in the remote access gateway, for example, may be accessed, and changes may be made to the stored version of the first computing device 700. When the first computing device 700 is connected to the remote access gateway, it may be synchronized with the stored version in the remote access gateway.

Figure 8:
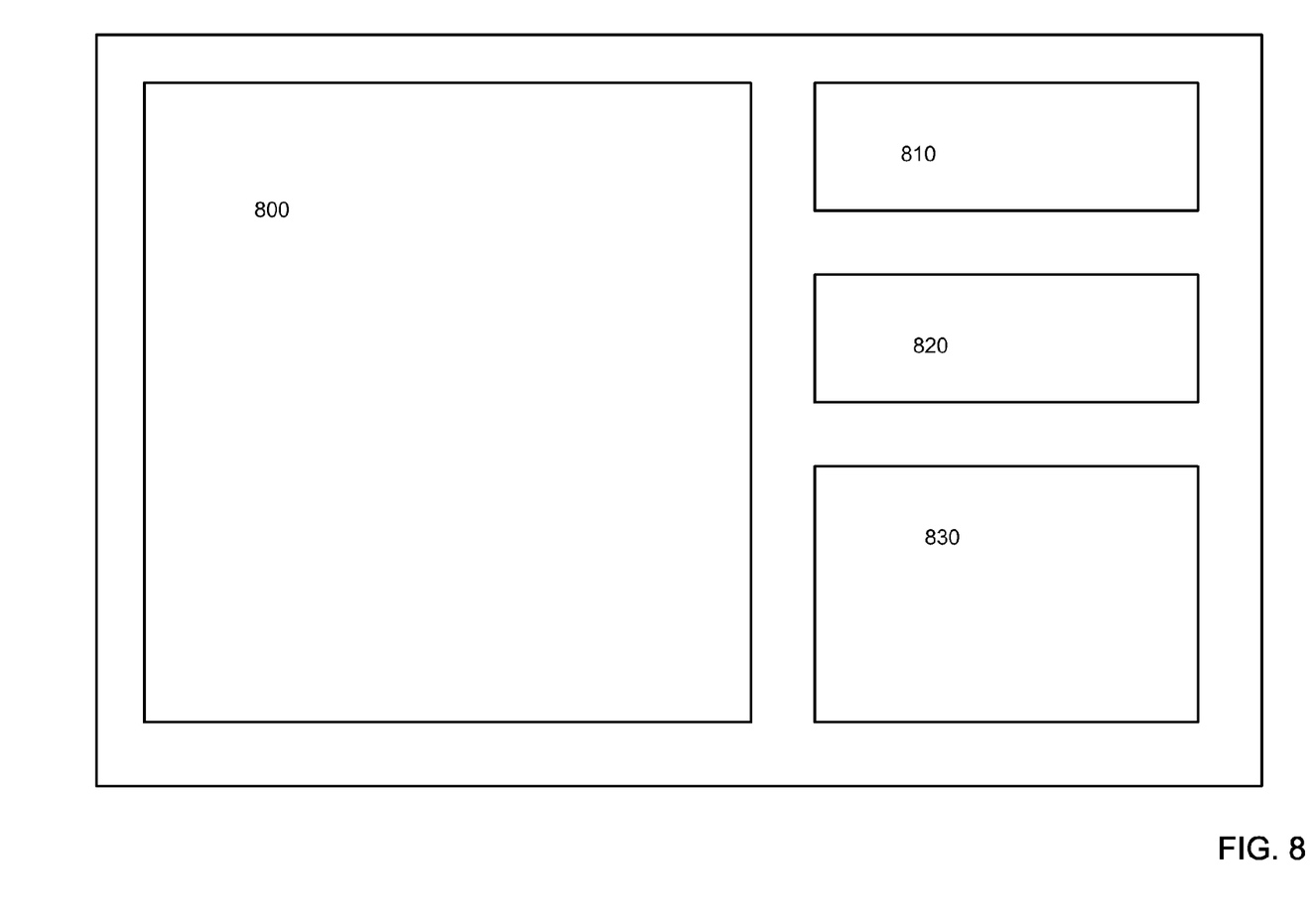
FIG. 8 is an illustration of a user interface that displays a remote desktop user interface.

FIG. 8 may be an illustration of a user interface on the second computing device 710 after the remote desktop connection has been created. The page may be a web based page that is created using Active X to control the first computing device 700. The display may contain a viewing area 800 where the desktop from the first computing device 700 may be visible, an area for remote desktop actions 810 such as disconnecting or connecting to another available computing device, an area for hints & tips about using the remote desktop application 820 and a blank host screen area 830. Of course, other relevant information is possible and is contemplated.

As a result of the described system, method and user interface, a user can access a virtually identical copy of a first computing device 700 from a second computing device 710. In addition, a copy of the first computing device 700 may be stored remotely. The second computing device 710 may access the stored copy of the first computing device 700 and changes may be made to the first computing device 700 even if the first computing device 700 is not powered on or connected to any network. The changes made to the saved version of the first computing device 700 may then be synchronized with the actual first computing device 700 when the device is connected to the network or powered on.

The invention claimed is:

1. A method of accessing a first computing device from a second computing device using a remote desktop service comprising:
   authenticating the first computing device using an authentication service;
   if the first computing device authenticating is successful:
      communicating an authenticated device ticket to the first computing device,
      attempting to connect from the first computing device to the remote access gateway,
      attempting to validate a device ID for the first computing device using an authorization service, if the first computing device ID is validated by the authorization service, mapping the device ID to a remote desktop device ID, registering the remote desktop device ID presence using a device connectivity service, connecting the first computing device to the remote access gateway, and listing in a device document that the first computing device is available for remote access to the second computing device;

on the second computing device, requesting the device document and connection from the device connectivity service wherein the device document comprises a list of remote desktop device IDs registered with the device connectivity service;

receiving the device document and a connection ticket from the device community service;

selecting a remote desktop ID from the device document wherein the selected remote desktop ID is the first computing device;

starting a client process using a remote rich desktop client on the second computing device;

if the connection ticket is received, communicating a request including the connection ticket from the second computing device to begin an anonymous SSL connection through the cloud mesh operating environment to the first computing device;

initiating on the second computing device a connection to the first computing device, the first computing device having a list of permitted computing devices that have permission to remotely access the first computing device;

starting a rich remote desktop client on the second computing device;

creating a request for a remote desktop protocol session with the first computing device using a mesh operating environment wherein the mesh operating environment obtains its settings from a mesh operating environment configuration file;

communicating the request through a cloud service to the first computing device;

establishing a channel from the second computing device to the first computing device through the cloud service on receiving an authorization to begin the desktop protocol session from a remote desktop server application on the first computing device through the cloud service;

receiving remote desktop protocol data flow from the first computing device on the second computing device through the cloud service, the first computing device being a node in a cloud network providing remote access of a first computing device display to a second computing device display using the cloud service, wherein the second computing device display is virtually the same as the first computing device display and all operation on the first computing device are available on the second computing device by using the second computing device display;

as data passes through the cloud service, storing a copy of the first computing device in the cloud service; and modifying the copy of the first computing device stored in the cloud service to create a modified stored first computing device even if the first computing device is not powered on.

2. The method of claim 1, wherein attempting to connect to a remote access gateway further comprises receiving a challenge from the remote gateway regarding validity of the authentication of the first computing device and responding to the challenge from the remote gateway.

3. The method of claim 2, further comprising executing a web page hosting remote desktop Active X control on the second computing device.

4. The method of claim 1, wherein communicating a request to begin a connection to the cloud mesh operating environment from the second computing device to the first computing device further comprises:
initiating a connection request from the remote rich client on the second computing device to the remote access gateway;
at the remote access gateway, validating the client device ID from the remote rich client operating on the second computing device using the authentication service;
validating the connection ticket communicated from the second computing device;
if the connection ticket is validated,
providing a connection request from the remote access gateway to the remote desktop server service operating on the first computing device; and
providing a connection response from the remote server service on the first computing device to the remote access gateway.

5. The method of claim 4, further comprising:
initiating a remote desktop protocol stream from the remote access gateway to the remote desktop server service on the first computing device;
providing an remote desktop protocol data flow from the remote desktop server service on the first computing device to the remote access gateway service; and
providing remote desktop protocol data flow from the remote access gateway service to the remote rich client operating on the second computing device.

6. The method of claim 1, further comprising displaying on first computing device that it is connected to the second computing device when it is connected to the second computing device.

7. The method of claim 1, further comprising requesting permission from the first computing device to provide remote access to the second computing device.

8. The method of claim 7, further comprising terminating the permission request if a response is not received after a threshold period of time.

9. The method of claim 8, further comprising on the first computing device granting permission for the second computing device to remotely control the first computing device until the permission is revoked.

10. The method of claim 1, further comprising displaying on the second computing device display a viewing area, an area for remote desktop actions, an area for hints & tips, and a blank host screen area.

11. The method of claim 1, further comprising:
synchronizing the modified stored first computing device with the first computing device when the first computing device accesses the cloud service.

12. A computer storage memory, storing computer executable code for accessing a first computing device from a second computing device using a remote desktop service, the computer executable code comprising code for registering the first computing device with a remote access gateway, the registering comprising:
authenticating the first computing device using an authentication service;
if the first computing device authenticating is successful, communicating an authenticated device ticket the first computing device;
on the second computing device, requesting a device document and connection from a device connectivity service, the device document comprising a list of remote desktop device IDs registered with the device connectivity service;

receiving on the second computing device the device document and a connection ticket from the device connectivity service;

selecting on the second computing device a remote desktop ID from the device document wherein the selected remote desktop ID is the first computing device;

initiating on the second computing device a connection to the first computing device;

starting a rich remote desktop client on the second computing device;

creating a request for a remote desktop protocol session with the first computing device using a mesh operating environment wherein the mesh operating environment obtains its settings from a mesh operating environment configuration file;

communicating the request through a cloud service to the first computing device;

receiving an authorization to begin the desktop protocol session from a remote desktop server application on the first computing device through the cloud service;

establishing a channel from the second computing device to the first computing device through the cloud service;

beginning remote desktop protocol data flow from the first computing device to the second computing device through the cloud service, the first computing device being a node in a cloud network providing remote access of a first computing device display to a second computing device display using the cloud service; and executing a web page hosting remote desktop Active X control on the second computing device wherein the second computing device display is virtually the same as the first computing device display and all operation on the first computing device are available on the second computing device by using the second computing device display;

as data passes through the cloud service, storing a copy of the first computing device in the cloud service; and modifying the copy of the first computing device stored in the cloud service to create a modified stored first computing device even if the first computing device is not powered on.

13. The computer storage memory of claim 12, the computer executable code further comprising code that if the first computing device authenticating is successful, executing computer code for:

attempting to connect from the first computing device to a remote access gateway;

attempting to validate a device ID for the first computing device using an authorization service;

if the first computing device ID is validated by the authorization service,
mapping the device ID to the remote desktop device ID;
registering the remote desktop device ID presence using the device connectivity service;
connecting the first computing device to the remote service; and
listing in the device document that the first computing device is available for remote access to the second computing device.

14. The computer storage memory of claim 12, further comprising:

if the connection ticket is received, communicating a request including the connection ticket from the second computing device to begin an anonymous SSL connection to cloud mesh operating environment to the first computing device.

15. The computer storage memory of claim 12, further comprising computer executable instructions for:

storing a copy of the first computing device in the cloud service;

permitting the second computing device to modify the copy of the first computing device stored in the cloud service to create a modified stored first computing device; and synchronizing the modified stored first computing device with the first computing device when the first computing device accesses the cloud service.

16. A computer system comprising a processor for executing computer executable code, a memory for storing computer executable code and an input/output device, the processor being programmed to execute computer executable code for accessing a first computing device from a second computing device using a remote desktop service, the computer executable code comprising code for:

registering the first computing device with a remote access gateway, the registering comprising:
authenticating the first computing device using an authentication service;
if the first computing device authenticating is successful, communicating an authenticated device ticket the first computing device;

initiating on the second computing device a connection to the first computing device, the first computing device storing a list of permitted computing devices having permission to remotely access the first computing device;

starting a rich remote desktop client on the second computing device;
creating a request for a remote desktop protocol session with the first computing device using a mesh operating environment wherein the mesh operating environment obtains its settings from a mesh operating environment configuration file;
communicating the request through a cloud service to the first computing device;
receiving an authorization to begin the desktop protocol session from a remote desktop server application on the first computing device through the cloud service;
establishing a channel from the second computing device to the first computing device through the cloud service;
beginning remote desktop protocol data flow from the first computing device to the second computing device through the cloud service;
executing a web page hosting remote desktop Active X control on the second computing device wherein a second computing device display is virtually the same as a first computing device display and all operation on the first computing device are available on the second computing device by using the second computing device display;

storing a copy of the first computing device in the cloud service;
permitting the second computing device to modify the copy of the first computing device stored in the cloud service to create a modified stored first computing device when the first computing device not powered on; and synchronizing the modified stored first computing device with the first computing device when the first computing device is powered on.

17. The computer system of claim 16, wherein communicating a request to begin a connection to cloud mesh operating environment from the second computing device to the first computing device further comprises:
- initiating a connection request from the remote rich client on the second computing device to the remote access gateway;
- at the remote access gateway, validating the client device ID from the remote rich client operating on the second computing device using the authentication service;
- validating the connection ticket communicated from the second computing device;
- if the connection ticket is validated,
  - providing a connection request from the remote access gateway to the remote desktop server service operating on the first computing device; and
  - providing a connection response from the remote server service on the first computing device to the remote access gateway.

\* \* \* \* \*